July 28, 1925.
F. L. O. WADSWORTH
1,547,243
SUPPLEMENTAL SPRING SUSPENSION SYSTEM
Filed Oct. 2, 1922
5 Sheets-Sheet 1
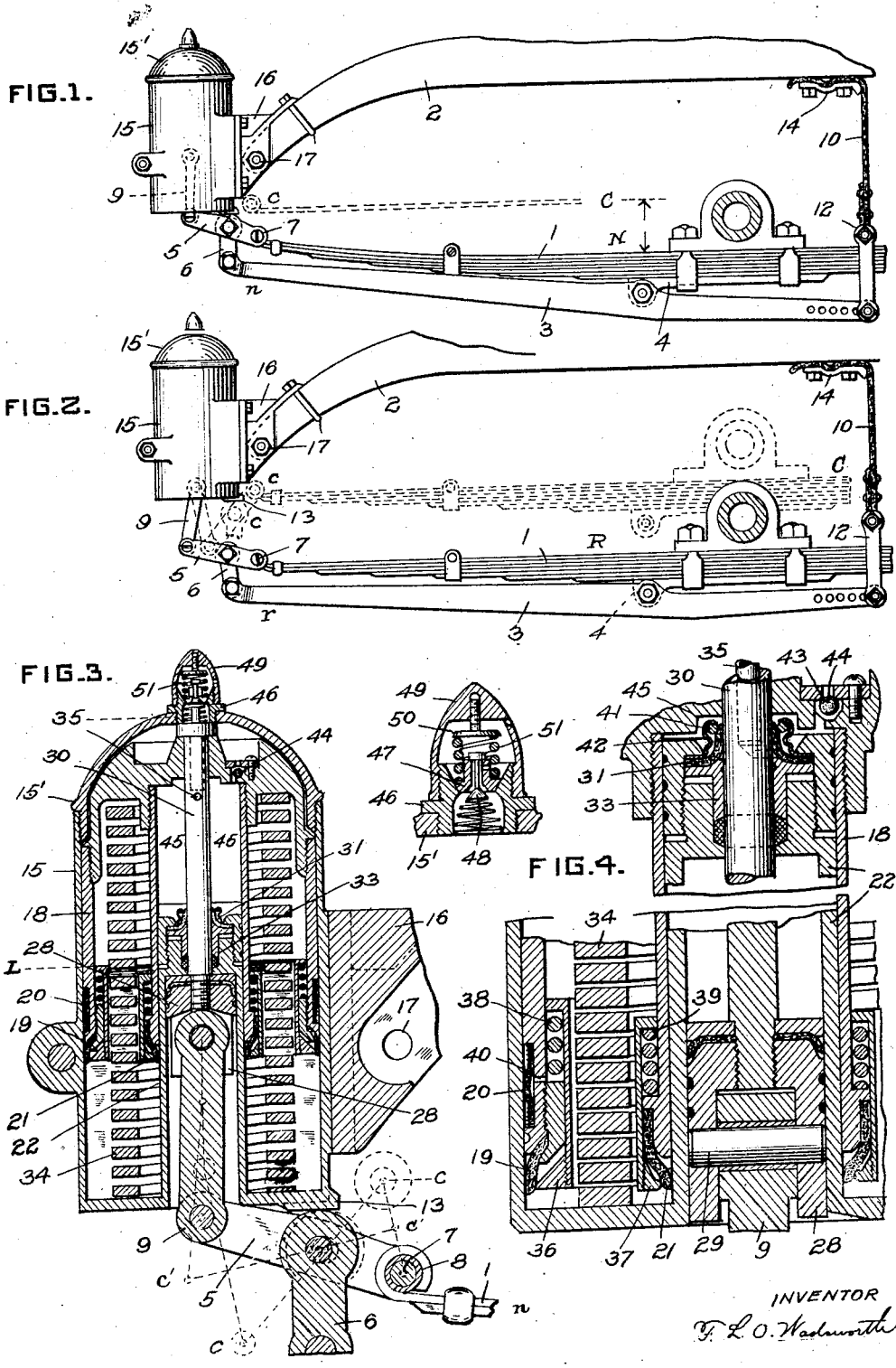
INVENTOR
F. L. O. Wadsworth July 28, 1925.  1,547,243
F. L. O. WADSWORTH
SUPPLEMENTAL SPRING SUSPENSION SYSTEM
Filed Oct. 2, 1922  5 Sheets-Sheet 2
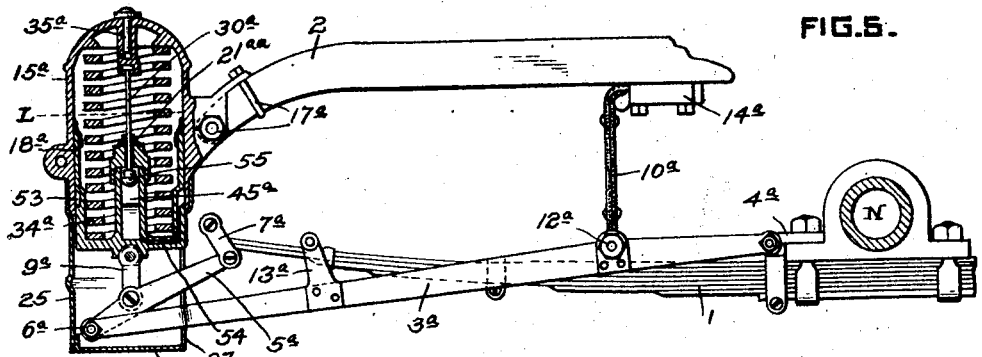
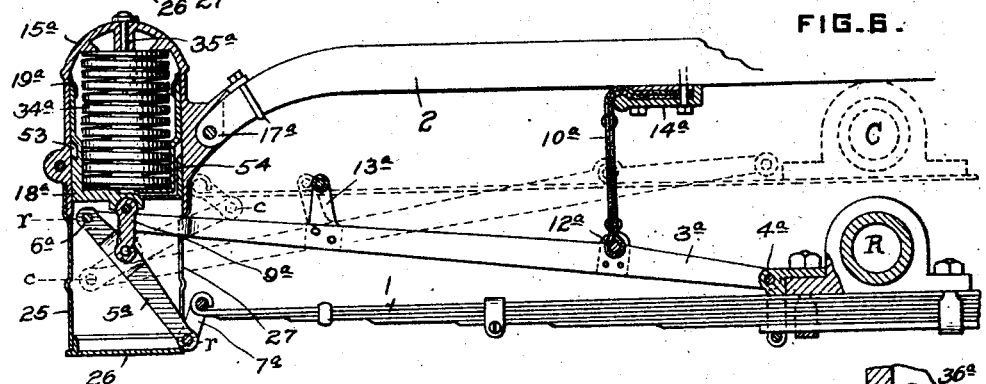
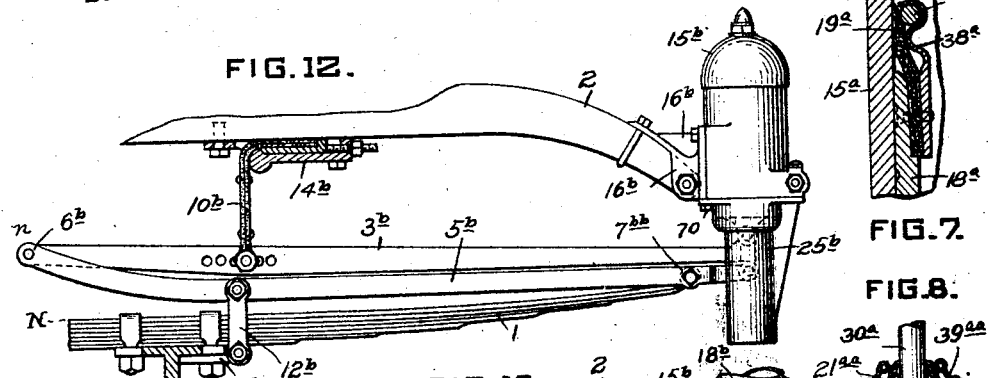
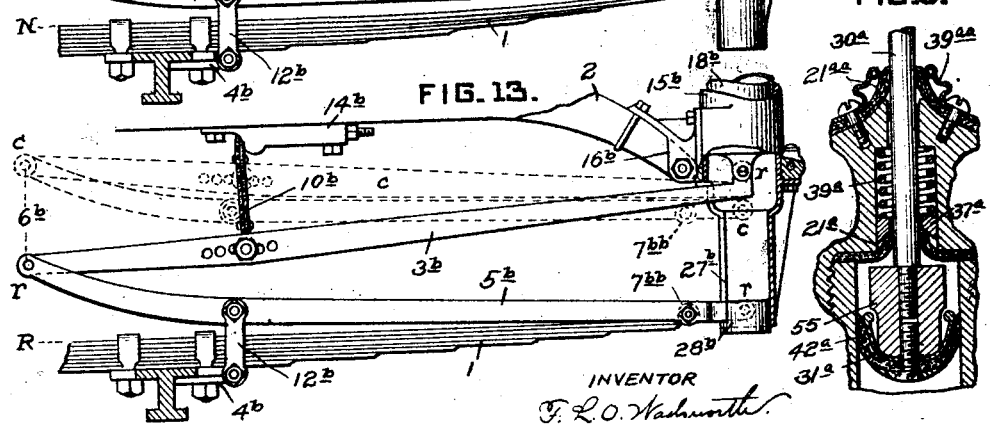
INVENTOR
F. L. O. Wadsworth

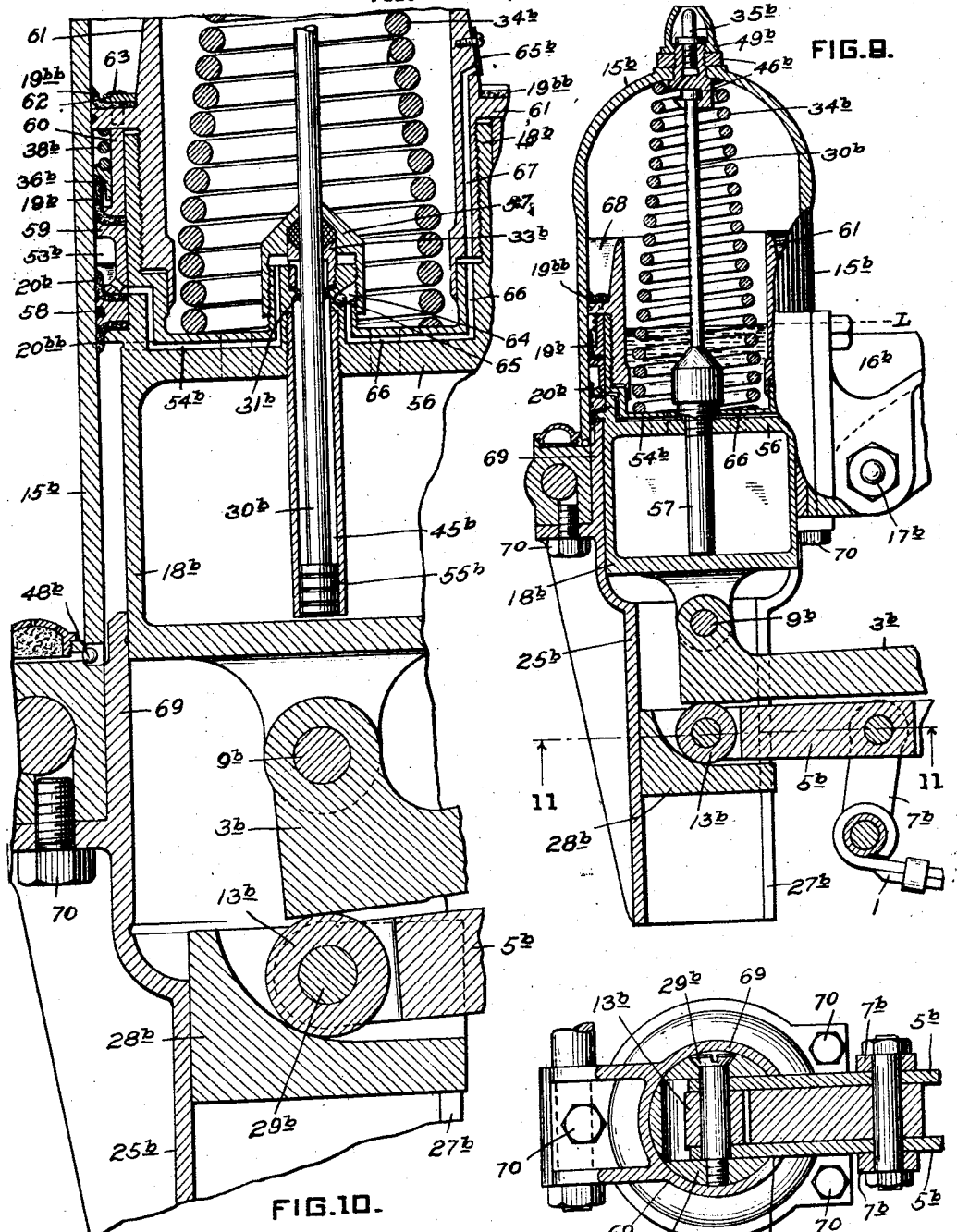

July 28, 1925.
F. L. O. WADSWORTH
1,547,243
SUPPLEMENTAL SPRING SUSPENSION SYSTEM
Filed Oct. 2, 1922   5 Sheets-Sheet 4
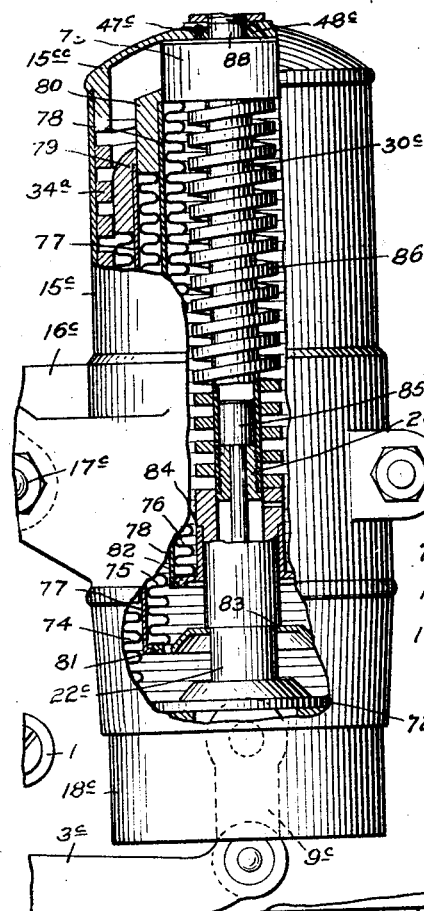
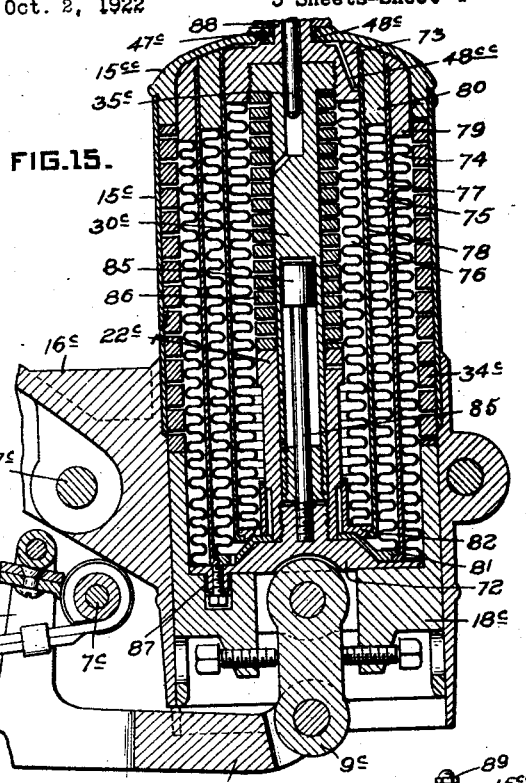
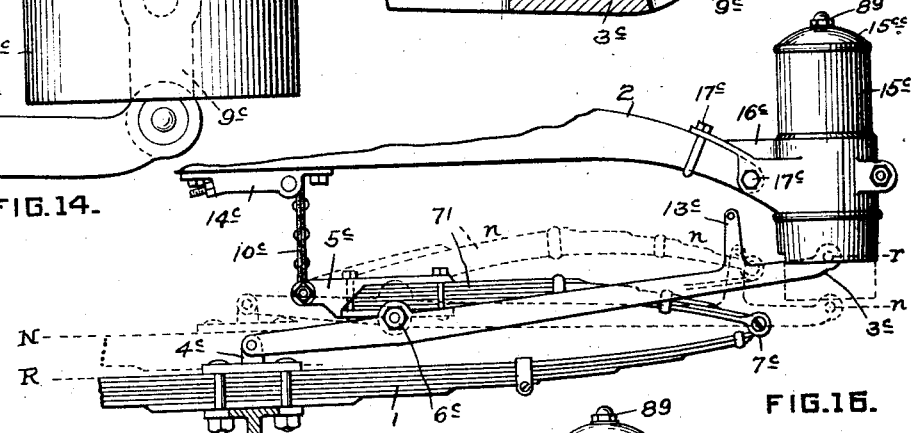
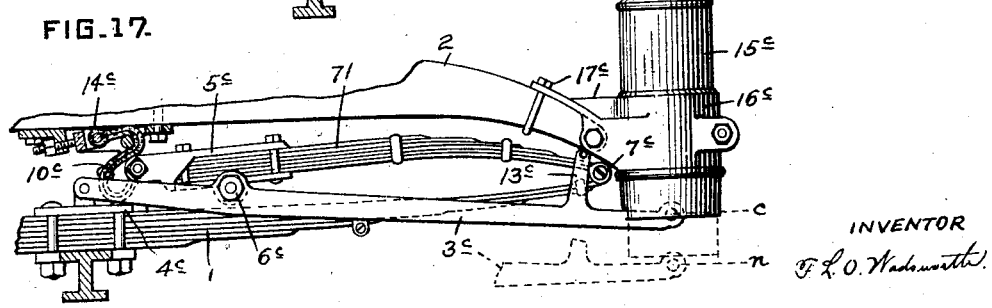
INVENTOR
F. L. O. Wadsworth

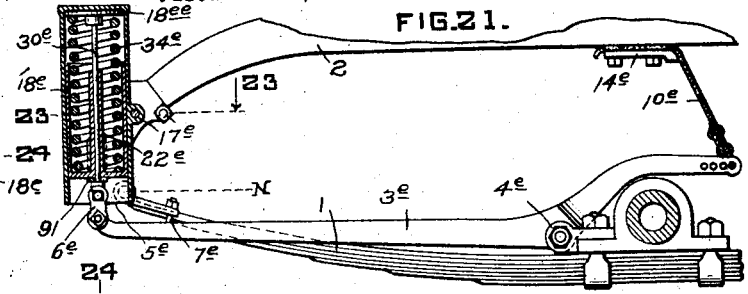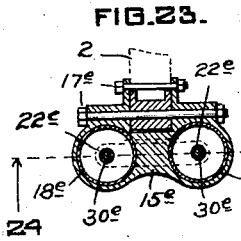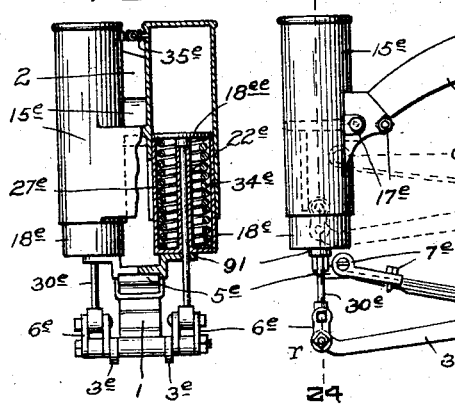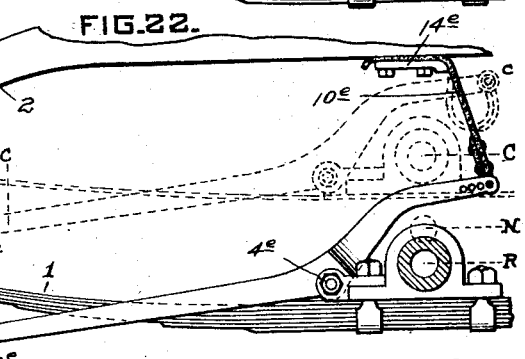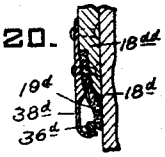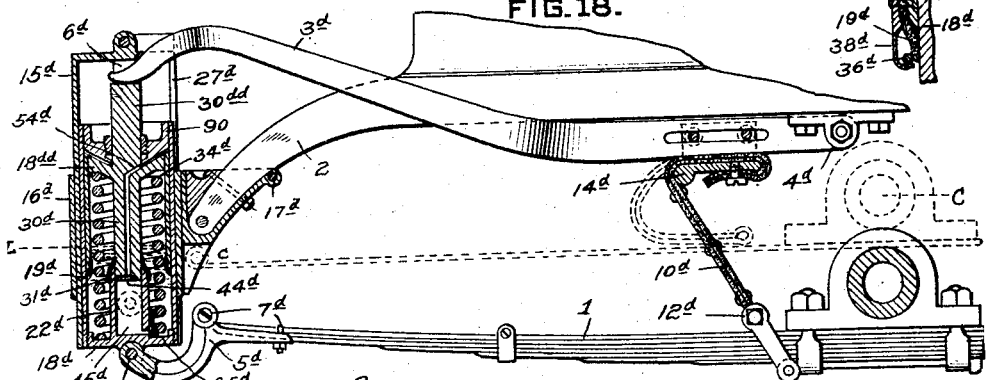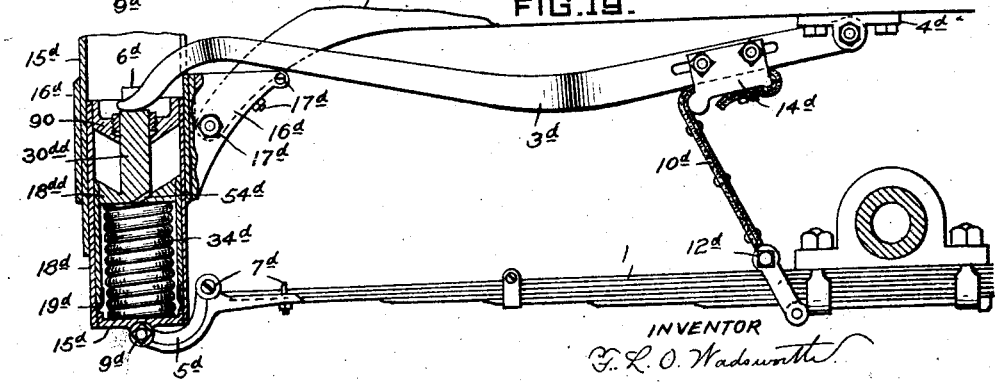

Patented July 28, 1925.

1,547,243

UNITED STATES PATENT OFFICE.

FRANK L. O. WADSWORTH, OF PITTSBURGH, PENNSYLVANIA.

SUPPLEMENTAL SPRING SUSPENSION SYSTEM.

Application filed October 2, 1922. Serial No. 591,708.

*To all whom it may concern:*

Be it known that I, FRANK L. O. WADSWORTH, a citizen of the United States, residing at Pittsburgh, Pennsylvania, have invented certain new and useful Improvements in Supplemental Spring Suspension Systems, of which the following is a full, clear, and exact description, such as will enable others skilled in the art to which it appertains to make and use the same.

My invention relates generically to that type of supplemental spring suspension systems that comprise a primary and a secondary spring which are arranged to act continuously in series with each other, and my present application is a continuation, in part, of my earlier application Ser. No. 400,256, filed July 30th, 1920, in which the general functional and operative characteristics of such organizations are quite fully explained. As there pointed out, one of the main purposes and objects of this species of construction is to provide a combination of parts which will operate to impose concurrent and progressively increasing flexures on both of the spring suspension units whenever the spring supported members are displaced in either direction from the normal, or static, load position; and which will therefore utilize the elastic resistance of both the primary and the secondary springs in cushioning and restraining not only the compression, but also the rebound or expansion of the suspension system.

A further object of these improvements is to provide a combination of main and supplemental spring units which are so connected and coordinated as to reciprocally exert an interbalanced action on each other whereby the flectural strain in each unit is transmitted to, and balanced against, the concurrent and cooperative strain in the associated unit; and the total load stress on the suspension system is uniformly distributed between, and equitably supported by, the primary and the secondary spring elements of the combination.

Another more specific purpose of my present invention is to provide an improved species of supplemental spring element which is of a semi-pneumatic type, and which has a large load carrying capacity and a wide range of action. A further special object of these improvements is the provision of connective mechanism conjoining said supplemental spring with the main spring in such manner that the secondary elastic element is compressed in the same direction by the movements of the primary spring element in opposite directions—away from normal load position—and the latter element is also concurrently compressed, or increasingly flexed as it is thus moved away from its locus of static equilibrium.

Other additional objects and other specific characteristics of various embodiments of this invention will be made apparent, to those skilled in this art, by the following more detailed description of certain exemplary constructions that are illustrated in the accompanying drawings in which:

Figs. 1 and 2 are general scale views of one form of my improved suspension organization as applied to the rear side leaf main spring of an ordinary vehicle chassis, and respectively illustrate the parts in the positions which they occupy, first when subjected to normal load, and second, when subjected to compression (dotted lines C—c), or expansion stresses (R—r); Fig. 3 is a central longitudinal section through the supplemental semi-pneumatic spring element of this organization (showing the parts in the normal load position of Fig. 1); and Fig. 4 is a fragmentary section on a still larger scale, of certain portions of the supplemental spring construction of Fig. 3 (as viewed on a plane at right angles to that of the said figure) with the parts thereof in the position of extreme displacement that is indicated in Fig. 2.

Figs. 5 and 6 are views, similar to those of Figs. 1 and 2, of a second illustrative embodiment of my invention—the supplemental spring units of this construction being depicted in longitudinal section—and Figs. 7 and 8 are enlarged detail views of parts of this second construction; Figs. 9 and 10 are sectional elevations of another semi-pneumatic spring structure that may be used as the secondary suspension unit of the organization shown in Figs. 5 and 6; Fig. 11 is an inverted cross sectional view on the plane 11—11 of Fig. 9; and Figs. 12 and 13 are side views of an alternate suspension organization that comprises, as one of its parts, the particular form of secondary spring structure that is illustrated in detail in Figs. 9, 10 and 11.

Figs. 14 and 15 are, respectively, a partial and a complete longitudinal section through a fourth form of semi-pneumatic spring construction, which may be utilized as the supplemental suspension element of either of the complete organizations depicted in Figs. 5—6—7—8 or 9 to 13, but which is here shown as a part of the suspension system that is illustrated in normal load and rebound positions in Fig. 16, and in compressed position in Fig. 17.

Figs 18 and 19 are side elevations—in partial section—of another exemplary embodiment of the present invention, and illustrate respectively the position of the suspension elements when the parts are in normal load position, and when they are expanded by the action of rebound stresses or shocks; Fig. 20 is a detail view of one part of the construction shown in these figures; Fig. 21 is a side elevation, partially in section, of another suspension system structurally analogous to that shown in Figs. 18 and 19; Fig. 22 is a second view of this same construction showing the parts thereof in the position of extreme rebound, and also (in dotted lines) in the position of extreme compression; Fig. 23 is a cross section on the plane 23—23 of Fig. 21; and Fig. 24 is an end view—partially in section on the plane 24—24 of Figs. 22 and 23.

The suspension organization that is depicted on the first sheet of my drawings—Figs. 1 to 4 inclusive—consists of an ordinary side leaf spring member 1, which is attached to the central portion of the body frame and to the axle of the vehicle in the usual manner; and which is conjoined, at its outer end, to the projecting body horn 2, through the intervention of my improved supplemental spring unit and its associated connective mechanism. As here shown the latter comprises a primary lever member 3 that is pivotally supported, at an intermediate point in its length, on the axle bracket 4, and is flexibly coupled at its outer extremity to the central part of a twin arm balance lever 5, by means of the solid shackle link 6. The twin balance arms 5 are pivotally connected at their opposite ends to the adjacent eye of the main spring 1—by the pintle bolt 7 and spacer bushing 8—and to the elastically controlled and vertically movable member of the supplemental spring unit—by means of the connecting rod 9. The supplemental spring elements are supported in any suitable manner on the body member 2; and the inner extremity of the primary lever, 3, is also coupled to the body sill by means of the adjustable "one way" strap and link connections 10 and 12.

The functional operation of this suspension organization is as follows: Under normal load conditions the upper enlarged portion of the shackle link connection 6 rests on a suitable stop 13 on the body support for the supplemental spring, and under such conditions the central portion of the balance lever 5 is held in relatively fixed vertical relation to the body members of the vehicle. The static load stress on the suspension system is then equitably distributed between, and jointly supported by, the downwardly flexed main spring 1—which is coupled to the inner end of the balance arms 5—and the initially tensioned supplemental spring, which is conjoined to the opposite extremity of the said balance arms, and acts in the opposite direction thereon. When the system is subjected to a kinetic increase in load stress, (e. g., a compressive "shock"), and the body and axle parts are forced toward each other—from the full line positions N—n of Fig. 1 toward the dotted line positions C—c of Figs. 1 and 2—the balance arms 5 are rocked in a counter-clockwise direction on the stop supported link 6; and the normal initial flexures or tensions of both the main and the supplemental spring elements are concurrently and conjointly increased as the approach or compression movement continues. During this phase of the operation the inner end of the lever 3 also approaches the body member, and the said lever is thus rocked on its central support; but this rocking movement has no functional effect on the action of the elastic suspension elements. But when the parts rebound or separate beyond the normal load position N—n of Fig. 1—and approach the positions R—r of Fig. 2—the "one way" connection 10—12 is brought into operative engagement and positively rotates the lever 3, in a counterclockwise direction, on the axle bracket 4; and this positive movement carries the balance arm and link connections 5—6 downward, or away from the body stop 13; thus concurrently depressing the interconnected ends of the main and supplemental spring elements, and progressively increasing the normal flexure or tension of both of these elastic support units as the movement continues. In this phase of the operation the balance lever 5 remains nearly parallel to its normal load position, but still performs the function of equitably distributing the displacement strains between the primary and secondary spring elements of the suspension system, and also performs its attendant and coincident function of permitting either of these elements to move and flex independently of the other in case such movement is necessary to properly balance, and to most effectively restrain, extreme displacements of the parts from the position of static equilibrium.

The opposite arms of the primary lever 3 are preferably so proportioned as to produce a given increased flexure of the elastic suspension units for a considerably smaller rebound, or expansion, of the body and axle members than is necessary to impose the same tension on these units by a compression or approach movement of the parts. The ratio between the linear displacements of the body and axle members—in the opposed compression and rebound actions—and the resultant or accompanying increased flexure of the elastic suspension elements, may be varied, as desired, by altering the relative distances between the axle bracket support pivot for the lever 3 and the pintle bolt connections between said lever and the links 6 and 12; and in the present example of my improved construction this alteration is permitted by the use of a series of holes (or an equivalent slot) for receiving the pintle bolt connection between the lever 3 and the links 12. Variations in the normal load loci of the parts—due to various causes—are in part automatically provided for by the balancing action of the lever 5; and may be further taken care of by the manual adjustment of the free length of the flexible strap 10 at the body clamp 14 therefor.

The supplemental spring element of the combination—which is connected to, and co-actuated with, the balance lever connection 9—may be of any suitable character and may be supported on the body member in any suitable way. In the form of construction that is shown in Figs. 1 and 2, the secondary suspension unit comprises a cylindrical casing 15, that is rigidly attached to the body horn 2, by means of the saddle 16 and the clamp bolts 17; and the casing contains a vertically reciprocable plunger that is flexibly coupled to the upper end of the balance lever connection 9. The reciprocation of this plunger may be elastically controlled by an ordinary helical coil spring which tends to resist the downward movement of the said member with respect to its casing support 15; but I prefer to employ for this purpose the semi-pneumatic spring unit which is illustrated in greater detail in the enlarged sectional views of Figs. 3 and 4. In this exemplary species of construction the casing guided plunger 18 has the form of an annular inverted cup, whose outer wall is provided at its lower edge with two flexible packing rings 19 and 20 that engage the inner surface of the casing 15, and whose inner wall is similarly provided at its free extremity with a similar packing ring 21 which engages the surface of a central boss 22 that projects upward from the closed lower end of the said casing. The boss 22 is bored out to receive and guide a slotted piston member 28 which is pivotally coupled to the lever connection 9 by a cross pin 29, and is attached to the upper end of the cup plunger 18 by means of the piston rod 30 that passes through the top of the boss 22 and is there provided with a flexible packing washer 31 and an adjustable packing gland 33. A coil compression spring 34 is interposed between the closed lower end of the casing 15 and the upper recessed end of the annular cup plunger 18. This spring is not in itself sufficient to carry the normal load stress on the supplemental spring element of the suspension system; and its elastic resistance is complemented by charging the closed chamber between the casing 15 and the plunger 18 with compressed air that may be introduced therein through any suitable valve and valve opening, such, for example, as is indicated at 35. In order to improve the sealing action of the packing rings 19—20 and 21— and also increase the ratio of volumetric compression of the confined fluid—the air spring chamber is filled with heavy oil or other suitable liquid to a level (L) which is considerably above the plane of these packing rings; and the latter are also provided with means for pressing their free edges into close sliding engagement with the respective surfaces on which they bear. In the case of the rings 19 and 21 this means comprises a beveled edge collar (36 or 37) which is pressed upwardly against the correspondingly beveled edge of the ring by the action of a compressed coil spring (38 or 39). In the case of the ring 20 the desired pressure contact with the casing surface is secured by providing a port, or ports, 40 that permit the compressed fluid in the air spring chamber to act on the central portion of the flexible band and force it out against the adjacent face of the casing. The upper edge of the piston rod packing washer 31 is also held in close engagement with the said rod by a metal ring 41 that is pressed down by the longitudinally elastic corrugated sleeve 42.

The base of the cup plunger is recessed on its upper side to receive a seat 43 that cooperates with a ball "float" valve 44, of some suitable material, and forms therewith a downwardly opening valve port to the upper end of the annular chamber 45 between the inner wall of the cup plunger 18 and the piston rod 30. The top of the casing 15 is closed by a screw cap 15', which conforms in outline to the adjacent end of the plunger member 18, and which is provided with a central screw plug 46 that covers the end of the piston member 30 and the valve connection 35. This plug may be itself imperforate—so as to completely close the opening in which it is inserted—but, as here shown, it is bored out to receive a composite valve member which comprises an outer upwardly opening head 47, that is seated in the plug 46, and an inner downwardly opening spring supported plug 48 that is seated in, and carried by, the outer head 47. The plug and valve assembly, 46—48, is covered by a perforated cap 49 which carries an adjustable screw plate 50;

and a coil compression spring 51 is interposed between the said plate and the valve head 47.

The operation of the semi-pneumatic supplemental spring shown in Figs. 3 and 4 is as follows: Any downward movement of the lever connection 9—whether produced by the compression or the expansion of the suspension system as a whole—depresses the cup plunger 18 and thereby concurrently increases the flectural compression of the coil spring 34, and the pneumatic pressure of the confined fluid in the plunger chamber. The concurrent downward movement of the piston head 28 creates a partial vacuum above that head—between the latter and the closed top of the central boss 22—and thus further augments the pneumatic resistance to displacements from the normal load positions shown in Fig. 3. If the plug 46 (or the cap 49) is made imperforate the separation of the cup plunger 18 and the casing cap 15' will also reduce the pressure in the closed space between these parts; and this reduction in pressure, with the accompanying outrush of air from the central piston chamber 45, will close the light "float" valve 44. The air thus trapped, at a somewhat reduced pressure, in the compartment 45 will be compressed by the further downward movement of the plunger; and the two cooperative effects last described—i. e., the reduction of pressure above the plunger head, and the increase in pressure in the chamber 45—will supplement the three effects first mentioned (viz, the coil spring compression, the air spring compression and the "suction" above the piston 28) in imposing a progressively increasing elastic restraint on all oscillating movements of the supplemental spring suspension system. But when the composite valve assembly 47—51 is used the two last described effects are prevented by the opening of the central valve element 48 and the admission of air at atmospheric pressure to the expanding space at the top of the casing; and the action is then modified in the manner to be later explained.

As the compressive movement continues the pressure of the confined fluid, both in the air spring chamber proper and in the auxiliary chamber 45, will be increased to a greater degree than the flexural resistance of the long coil spring increases; and by properly proportioning the elastic characteristics of this coil and the normal charge of mixed liquid and gas in the fluid pressure chamber, any desired coefficient of supplemental spring resistance—or any desired relation between displacement movement and the elastic restraint thereto—can be easily obtained. A further advantage that results from the combination of the two species of springs in a single unit is, that the use of a relatively powerful metal coil to carry a substantial part of the load correspondingly decreases the pneumatic pressure which it is necessary to carry in the air spring chamber, and thus reduces the requisite tightness of the packing rings, 19, 20, 21 etc., and the attendant frictional resistance to the relative movement of the associated parts. The greater freedom of action thus obtained makes it possible to utilize more fully the characteristic sensitiveness and resiliency of the "air spring," and to substantially eliminate the sticking and "freezing" that frequently occurs, in the use of tightly packed joints, after a period of inactivity. The lower initial pressure in the fluid chamber also permits the use of a greater ratio of volumetric compression—or of a smaller clearance space between the liquid and the top of the air cell at the end of the compression stroke—thus decreasing the length or height of my improved semi-pneumatic spring, and securing greater compactness of structure, without any sacrifice of the carrying capacity or the range of action of the secondary suspension unit. The use of the mechanical coil spring presents the further advantage of affording a positive mechanical stop when the coils have been closed "solid" by an extreme compressive movement—an advantage that is particularly pronounced when the helically coiled strip is of rectangular cross section as shown in Figs. 3 and 4—and this spring can act by itself to prevent the collapse of the supplemental elastic suspension unit in case of the leakage or rupture of the fluid pressure container. On the other hand the utilization of the air spring element as a part of the combination permits of an easy and wide-ranged adjustment of the initial tension, and of the aggregate load carrying capacity, of the supplemental suspension unit—when the parts are in a desired and predetermined position of static equilibrium—without any change in the mechanical structure or arrangement of the various parts.

Any leakage of liquid past the packing ring 21 will pass directly into the auxiliary piston chamber 45. Any leakage past the rings 19 and 20 will flow upward over the edge of the recess in the base of the inverted cup plunger 18, and thence, through the downwardly opened valve 44, into this same central chamber. This leakage will collect in the annular pocket surrounding the piston rod packing elements 31 and 33 and will serve, first of all, to lubricate and assist in the sealing of these piston rod bearings. When the parts are in operation leakage past the rings 19, 20 and 21 will be almost entirely prevented—even when these rings fit quite loosely—by the action of the valve elements 47—51. When the compression movement has been arrested (by the joint action of all the forces previously enumerated) and the depressed plunger 18 begins its upward or return movement, the inner valve 48 is closed by its spring support and the air which is trapped at atmospheric pressure in the upper part of the casing is progressively compressed until the fluid pressure on the opposite sides of the sealing rings, 19—20 and 21, is partially, or completely, equalized. Under these conditions any further outflow of liquid past the said rings will be arrested; and the liquid which has already escaped will tend to return to the interior of the fluid pressure chamber under the combined effect of gravity and the "back wiping" action of the "flap valve" packing elements 19, 21 and 31. If a considerable amount of liquid accumulates in the bottom of the central chamber 45 (as a result of a long continued leakage while the parts are inactive) the first extended movement of the reciprocating parts will close the valve 44—by the relatively rapid compression of the air above the accumulated pool of liquid—and sufficient pressure will then be exerted on the said liquid to force the excess back past the "flap valve" packing ring 21, into the fluid pressure chamber. An extreme compression stroke—such as will result from such displacements as are indicated in Figs. 2 and 4—will thus positively return substantially all of the escaped liquid to the air cell. It will be apparent that this last action will take place when the plug 46 (or the cap 49) is either imperforate or is provided with the valve assembly 47—51.

The use of the spring closed valve elements 47—48 is of further advantage, in some cases, in providing a pneumatic check on the too violent recoil of the elastic suspension units from positions of excessive displacement and flexure. The compression of the air that is trapped above the plunger head by the closing of the valve 48 imposes a progressively increasing restraint on the return or recoil movement of the parts to normal load position, and thus tends to diminish the rebound or inertial "overthrow" of the flexed springs when that position is reached. The degree of restraint thus exercised on the recoil action may be varied and controlled by adjusting the position of the spring plate 50—and the resultant tension of the spring 51—so as to permit the valve 47 to open at a predetermined pressure. This adjustment should be so made that this relief valve will always open before the pressure in the top of the casing substantially exceeds that within the fluid pressure chamber, in order to avoid any possible danger of forcing air into the said chamber and thus unduly raising the initial pressure therein.

Figs. 5 and 6 illustrate another construction, which is quite analogous to the one just described; but which differs therefrom in various structural details. In the second illustrative embodiment of my invention a primary lever 3ᵃ is pivotally supported, at its inner extremity, on the axle bracket 4ᵃ of a main side leaf spring 1, and is coupled, at an intermediate point in its length, to the body of the vehicle by the "one way" flexible strap connection 10ᵃ. The outer end of this primary lever is conjoined with the free end of the main spring and with the supplemental spring support therefor by means of the equalizing or balancing lever 5ᵃ, which is connected to these three members by the respective pintle and shackle elements 6ᵃ, 7ᵃ and 9ᵃ; and the downward rocking movement of the primary lever 3ᵃ (on its pivot support 4ᵃ) is limited, either by the cross bolt connection 12ᵃ or by a special stirrup bracket 13ᵃ, that individually or conjointly engage with intermediate parts of the main leaf spring 1, when the members are in the normal load position of Fig. 5. When the system is subjected to a kinetic increase in load stress—which tends to move the members toward the dotted line positions C—c—c of Fig. 6—the linkage assembly 3ᵃ—5ᵃ—6ᵃ—7ᵃ—9ᵃ is lifted as a unit toward the body member, by the engagement between the main spring and one or both of the parts 12ᵃ and 13ᵃ; and the initial flexures or tensions of both the main spring and the supplemental spring are concurrently and conjointly increased by the balanced action of the equalizing lever connections 7ᵃ and 9ᵃ. When the system is subjected to rebound or expansion stresses—which will move the members from the normal load position of Fig. 5 toward the full line positions R—r of Fig. 6—the primary lever 3ᵃ will be lifted away from the main spring 1 by the action of the strap 10ᵃ; and the primary and secondary spring units will be again increasingly flexed by the reverse movements of the balance lever connections 7ᵃ—9ᵃ. In this, as in the previously described, phase of the operation, the flexural strain on one spring unit of the suspension system is transmitted to, and balanced against, the concurrent and cooperative strain on the other elastic unit thereof; but each spring unit is also permitted to flex independently of the other—by the rocking movement of the lever 5ᵃ on any one of its pivotal connections 6ᵃ, 7ᵃ or 9ᵃ—after the limit of compression of one of the said springs is reached.

In the organization shown in Figs. 5 and 6 the supplemental spring must be arranged to resist the upward movement of the lever connection 9ᵃ. This necessitates a secondary spring construction which is structurally different from that shown in Figs. 1 to 4, in which the auxiliary suspension member is designed to elastically restrain the downward movement of the connection 9. In the exemplary form depicted in Figs. 5 and 6 the supplemental spring unit comprises a casing $15^a$, which is attached to the body sill, 2, by the bolts $17^a$, and which is bored to receive an annular upright-cup-shaped plunger $18^a$, that fits closely in the said casing and is provided at its upper edge with a suitable packing or sealing ring $19^a$, (such, for example, as is shown in greater detail in Fig. 7). A powerful coil spring $34^a$, which is capable of sustaining a substantial part of the normal load stress on the suspension system, is interposed between the upper end of the casing $15^a$ and the lower extremity of the plunger $18^a$; and the closed chamber between these relatively movable parts is charged with compressed air, at a pressure capable of sustaining the remainder of this load, through a suitable valve connection $35^a$. The fluid pressure chamber is preferably filled with heavy oil to a level, L, above the plane of the packing ring $19^a$; and the lower portion of the plunger wall is provided with a deep groove 53 which will collect any liquid that may leak past the packing washer, and direct it, through the passage way 54, to the chamber $45^a$ that is formed in the central portion of the annular cup member $18^a$. The chamber $45^a$ contains a cup leather piston 55, which is connected to the cap of the casing $15^a$ by the piston rod $30^a$; and this rod is provided with two cup leather packing rings $21^a$ and $21^{aa}$ at the point where it passes through the upper end wall of the chamber $45^a$ (see Fig. 8). When the compression movement of the plunger $18^a$ carries the piston 55 below the level of the accumulated oil in the piston chamber $45^a$, the cup leather piston ring $31^a$ will permit this liquid to flow into the top of the chamber; and on the return of the parts to normal load position this increment of trapped oil will be forced back into the air chamber through the cup "valve" packing rings $21^a$ and $21^{aa}$. Any unusual or abnormal leakage of liquid from the air spring cell will thus be constantly returned thereto when the parts are in operation; and the use of the coil spring $34^a$, to carry a large part of the load, so reduces the necessary fluid pressure in the semi-pneumatic spring unit as to greatly diminish the tendency to such leakage even when the packing rings, $19^a$, $21^a$ and $21^{aa}$, have a very easy sliding engagement with the adjacent surfaces of the casing and piston members $15^a$ and $30^a$.

In order to protect the bearings of the linkage assembly, $3^a$—$5^a$—$6^a$—$7^a$—$9^a$, against dust and dirt; and in order further to prevent side sway or lateral displacement of the vertically oscillating main spring and lever members; I preferably provide a shield 25 which is attached at its upper end to the casing $15^a$ and is closed at its bottom by a flanged head 26, and which is provided at one side with a slot 27 that is just wide enough to receive and guide the contracted end portion of the twin arm lever $3^a$, and the sides of the twin shackle links $7^a$—(which can pass freely through the expanded portion of the said lever)—as the parts swing through the various positions indicated in full and dotted lines in Figs. 5 and 6.

Figs. 9, 10 and 11 illustrate in detail another form of semi-pneumatic supplemental spring structure which can also be used as a part of the suspension organization shown in Figs. 5 and 6. This alternate design of secondary spring construction comprises a casing $15^b$, which is rigidly attached to the body horn 2 by means of the bracket $16^b$ and the bolts $17^b$; and an upright cup plunger $18^b$ which is provided, in this case, with a perforated partition, or raised secondary bottom, 56, that carries the lower end of the supplemental coil spring $34^b$. This partition also supports a tube which contains a piston chamber $45^b$ and which is adapted to receive a piston $55^b$, that is attached to the cap of the casing $15^b$ by the piston rod $30^b$ and the slotted-head bolt and nut connection $46^b$. The upper end of the piston chamber $45^b$ is closed by an inwardly turned cup washer $31^b$ and a radially perforated gland ring $33^b$ which are covered and clamped in place by the screw cap 57. The upper edge of the plunger $18^b$ is provided with a series of packing rings, $19^{bb}$, $19^b$, $20^b$ and $20^{bb}$, the first three of which are arranged to prevent the outward flow of fluid from the casing-plunger enclosure, and the last one of which is reversely arranged to prevent the flow of air inwardly thereto. The three lower rings $20^{bb}$, $20^b$ and $19^b$, are separated by rigid collars 58 and 59, and the upper one of these rings ($19^b$) is held in close engagement with the casing $15^b$ by means of the expander ring $36^b$ and the compression spring $38^b$. All of these parts are conjunctively clamped in position on the outer shouldered edge of the plunger $18^b$ by the collar 60 and the screw cap 61. The upper ring $19^{bb}$ is separately attached to this cap 61 by means of the annular washer 62 and screws 63. The collar 59 is recessed to form an annular space $53^b$ that is adapted to collect any liquid which may leak past the washers $19^{bb}$ and $19^b$; and this space communicates, through the passage $54^b$, with an annular recess—between the cap 57, the radially perforated gland ring $33^b$ and the flexible packing ring $31^b$—at the upper end of the central piston chamber. This part of the chamber, $45^b$, is also provided with a lateral port 64, which is controlled by an outwardly opening ball valve 65, and which opens into the conduit 66 that leads to the inner shouldered edge of the plunger member 18$^b$, where it communicates—through the annular opening between this edge and the adjacent overlapping collar on the screw cap 61—with a longitudinal passage way 67 in the said cap. The upper end of this last passage opens into a deep annular groove 68 that is formed by the upwardly projecting portion of the cap 61 and the adjacent surface of the casing 15$^b$; and this discharge opening may be covered by an outwardly yielding flap valve 65$^b$. The enclosed chamber between the relatively movable casing and plunger members, 15$^b$—18$^b$, is filled with oil or other suitable liquid to a depth, L, that is sufficient to cover the piston gland cap 57; and is then charged with compressed air (through a suitable valve connection 35$^b$) at such pressure as is necessary to support that portion of the normal load that is not carried by the coil spring 34$^b$. In operation any liquid that leaks past the cup washers or packing rings 19$^{bb}$—19$^b$, and collects in the groove 53$^b$, is returned to the fluid pressure chamber by the action of the valve and piston elements 31$^b$—55$^b$—65 and 65$^b$. This liquid is discharged, into the groove 68 above the packing rings 19$^{bb}$, 19$^b$, and thus serves to always cover and lubricate and "seal" these packing elements even when the main level, L, of the liquid is considerably below the plane of the said rings.

In this exemplification of my improved semi-pneumatic supplemental spring construction the diameter of that portion of the plunger 18$^b$ which is below the cup washer 20$^{bb}$ is considerably less than the bore of the casing 15$^b$; and the lower end of the said casing is provided with a removable and renewable bushing 69 that is secured thereto by the bolts 70. The annular chamber between the parts 15$^b$—18$^b$—20$^{bb}$ and 69 is in communication with the external air through an inwardly opening ball valve 48$^b$; and on the compression stroke this valve admits air at atmospheric pressure to the expanding chamber (see Fig. 10). On the reverse or return movement of the parts the valve 48$^b$ closes; the air thus trapped in the said annular chamber is progressively compressed as the movement continues; and a pneumatic check is thus imposed on the recoil of the compressed spring elements of the suspension system. The downwardly turned cup washer 20$^{bb}$ prevents any flow of this trapped fluid upwardly into the oil collecting groove 53$^b$; but a portion of the compressed air is expelled through the unpacked bearing clearances between the plunger 18$^b$ and the lower guide bushing 69, and serves the added function of keeping this bearing free from dust and dirt.

The lower end of the plunger 18$^b$ may be connected to the equalizing lever element 5$^a$, of the suspension organization illustrated in Figs. 5 and 6, by means of a shackle link connection 9$^a$ such as is there shown. But as here depicted the supplemental spring plunger is directly connected, by the pintle bolt 9$^b$, with the end of the primary lever 3$^b$, and, in the positions illustrated in Figs. 9 and 10, the outer end of this lever rests on a roller 13$^b$ which is carried by the adjacent forked extremity of the lever 5$^b$. As shown in Figs. 12 and 13—which exemplify another complete suspension system that may be used in conjunction with the secondary spring units of either Figs. 5 and 6 or Figs. 9—10 and 11—the two lever elements are coupled together, at their inner ends, by the cross bolt 6$^b$; and are respectively connected, at median points in their length, with the body member of the chassis by the flexible strap 10$^b$, and with the axle bracket 4$^b$ by the longitudinally rigid links 12$^b$. The outer extremity of the lever 5$^b$ is coupled to the eye end of the main side leaf spring, either by the shackle links 7$^b$, as shown in Figs. 9–11, or by the pintle bolt 7$^{bb}$ shown in Figs. 12 and 13; and this portion of the secondary equalizing member is also preferably connected to, and guided by, a cylindrical head 28$^b$ which slides in the slotted extension 25$^b$ of the bushing 69. The slot 27$^b$ of this extension is preferably made just wide enough to closely embrace the sides of the levers 3$^b$ and 5$^b$ (as best shown in Fig. 11), and of such length as to permit the lever 3$^b$ to engage, at its upper limit of movement, with the lower side of the bracket support 16$^b$ of the casing 15$^b$.

The operation of the compound lever connections between the main and supplemental spring units of this last described suspension organization is as follows: When the system is subjected to the normal or static load stress the parts are in the positions shown in Figs. 9 and 12 in which the two levers are in operative pressure engagement at the roller connection 13$^b$, and in which the body and axle connections, 10$^b$—12$^b$, are also maintained in tensioned relation by a slight initial stretching of the strap 10$^b$. When the normal load stress is kinetically increased—e. g. by compressive shocks—the body and the main spring axle members are forced toward each other, and the engaged lever elements are moved, as a unit, toward the dotted line positions $c$—$c$—$c$ of Fig. 13. The increased stress on the main leaf spring 1 is transmitted, through the lever 5$^b$ and its connections 7$^{bb}$ (or 7$^b$) and 13$^b$, to the end of the primary lever 3$^b$ and thence to the supplemental spring parts 18$^b$—34$^b$ etc.; and the resultant flexural strains on the two elastic suspension units are mutually balanced against each other until the compressive movement has either closed the coils of the spring 34$^b$ (or 34$^a$), or has brought the upper edge of the engaged lever system, 3$^b$—5$^b$, into contact with the bracket support 16$^b$ (see dotted lines of Fig. 13). When the flexure of the supplemental elastic suspension unit has been arrested in this, or in any other desired, manner, the main spring may be further flexed, independently of the secondary spring support, by the direct pressure engagement between the bracket 16$^b$ and the interengaged lever and main spring connections, 3$^b$—13$^b$—5$^b$—7$^{bb}$. When the system is subjected to a rebound or expansion stress—which tends to carry the parts from the positions shown in Figs. 9 and 12 toward the positions R—r—r, shown in full lines in Fig. 13—the mutual and oppositely directed pulls of the tensioned strap and link couplings 10$^b$—12$^b$ will cause the levers, 3$^b$ and 5$^b$, to rotate in opposite directions on their cross bolt connection 6$^b$; and the initial flexures of the two elastic suspension units will be thus concurrently increased in substantially the same ratio—which may be varied to some degree by adjusting the point of connection between the strap 10$^b$ and the lever 3$^b$—until the lever 3$^b$ is again brought into engagement either with the top of the slot 27$^b$, or with the adjacent face of the bracket support 16$^b$. When this engagement occurs the compression of the supplemental spring unit is arrested; but the further separation of the body and axle members will continue to flex the main spring 1, in the same direction as before, by the increased clockwise rotation of the lever 5$^b$ on the now fixed fulcrum support 6$^b$. If, on the other hand, the positive flexure of the main spring is checked at any point in the expansion movement, the reverse, or counterclockwise, rotation of the lever 3$^b$—under the pull of the strap 10$^b$—will continue to compress the secondary spring unit until the limit of that compression is reached. This cross connected lever system—like those previously described—therefore maintains an automatic balance between the cooperative flexural strains in the two series conjoined suspension springs, but also permits either one of these elastic units to flex independently of the other at any, or all, stages of the operation.

Figs 14 and 15 illustrate still another form of semi-pneumatic supplemental spring construction that can be used as the secondary suspension unit in either of the systems of Figs. 5—6 or Figs. 13—14; but which is here shown as a part of the system depicted in Figs 16 and 17. In this construction a cylindrical casing sleeve 15$^c$ is rigidly secured in a bracket 16$^c$ which is attached to the body horn 2 by the bolts 17$^c$, and which is bored to receive and guide a short vertically reciprocable plunger head 18$^c$. A coil spring 34$^c$—which is preferably made from material of rectangular cross section—is interposed directly between the upper end of the plunger, 18$^c$, and the cap 15$^{cc}$, of the casing sleeve 15$^c$; and is confined therebetween at an initial tension that suffices to carry a substantial part of the static load. The fluid spring element—which in this case, consists of a self contained unitary assemblage of parts—is also interposed, as a structurally independent member, between the central cross head portion of the plunger 18$^c$ and the said cap 15$^{cc}$; and the pressure therein is adjusted until it is sufficient to maintain the elastic suspension units in the normal positions of static equilibrium shown in Fig. 14 (and also indicated by the dotted lines N—n—n etc. of Figs. 16 and 17).

The plunger head 18$^c$ is attached in any suitable manner—as by the connecting link 9$^c$—with the outer extremity of a twin arm lever 3$^c$, that is pivotally supported, at its inner end, on the axle bracket 4$^c$. The intermediate portion of this lever carries a cross bolt 6$^c$ which supports a secondary lever 5$^c$, that is flexibly coupled, at its inner end, to the body of the vehicle by the strap 10$^c$. The outer portion of the lever 5$^c$ is made in the form of a stiff leaf spring 71, which is directly connected to the end of the main spring, 1, by the recessed flat head pintle bolt 7$^c$. The primary lever 3$^c$ is also provided with a saddle 13$^c$ which is so positioned as to normally engage the upper leaf of the spring 71 at a point near its pintle bolt connection with the main suspension unit 1.

The operation of the last described suspension organization is analogous to that of the previously considered systems, and will be readily understood without extended explanation. When the system is compressed, the interconnected main spring-axle-lever assemblage is moved, as a unit, toward the body (as shown in Fig. 17);—the stress on the main suspension member, 1, is transmitted to the supplemental suspension elements through the action of the saddle and link connections, 13$^c$—3—9$^c$;—and the resultant flexural strains on the primary and secondary springs are equitably distributed, and balanced, between the coacting elastic supports. When the system is subjected to rebound or expansion stresses—which tend to displace the parts from the dotted line positions N—n toward the full line positions R—r of Fig. 16—the movement of the axle block 4$^c$, away from the body, and the concurrent pull of the strap connection 10$^c$, results in an opening "scissors" action of the two cross connected levers 3$^c$—5$^c$, and again produces a conjoint increased flexure in both the main and the supplemental spring elements;—the bending of the primary suspension member 1 being, in this case, modified in degree by the accompanying positive flexure of the lever spring arm 71 which acts in series therewith during this expansion movement. And in this case, as before, the linkage connections between the primary and the secondary spring supports not only maintain an automatic balance between these mutually flexed suspension elements, but also permit either of them to flex independently of the other, whenever such action is necessary because of the "sticking" or checking of the free elastic movement of one of the said spring supports.

The fluid pressure spring which is shown in Figs. 14 and 15—as the complement of the coil spring 34$^c$—is a "packless" hermetically sealed structure substantially identical in character with those which are illustrated and described in my copending application filed July 10, 1922, Ser. No. 573,882; and only a very brief explanation of the more salient features of this construction will be given here. It comprises two rigid heads 72 and 73 which are connected by a group of concentric and longitudinally flexible tubes 74—75—76, that are coupled in series, or "end to end" relationship by the intervening rigid transmission sleeves 77 and 78. These sleeves are provided, at their upper ends, with collars 79 and 80 which are in sliding engagement with each other and with the top head 73; and are attached at their lower ends, to perforated heads 81 and 82, that encircle the central extension 22$^c$ of the bottom head 72, and are limited in their upward movement thereon by the shoulders 83 and 84. The head extension 22$^c$ is bored to receive the lower end of a hollow sleeve 30$^c$ that is attached to the upper head 73; and the separation of the two heads, 72—73, is limited by a piston bolt 85, which is screwed into the lower head and engages with the cap 28$^c$ of the sleeve 30$^c$. An auxiliary coil spring 86 is interposed between the parts 72—22$^c$ and 30$^c$—73, and serves to assist in maintaining the assembled cell parts in their expanded position (Fig. 14).

The hermetically sealed flexible-wall-container is preferably charged with fluid to the desired pressure, before it is inserted in the casing support 15$^c$—the requisite charge of mixed oil and gas being introduced either through the screw closed opening 87 or the valve controlled passage 35$^c$—and the elastically distended cell is then inserted in the casing and secured to the upper cap thereof by the bolt extension 88 and nut 89.

In operation the upward movement of the plunger 18$^c$ in its casing support 15$^c$—16$^c$ (whether produced by a compressive or a rebound movement of the body and axle members) forces the air spring heads 72—73 toward each other and thus reduces the volumetric capacity of the fluid pressure chamber; this contractive action being permitted by the yielding of the three series connected flexible walls 74, 75 and 76. The approach of the parts 72 and 73 also causes the piston cap 28$^c$ to move downward in the bore of the extension 22$^c$, and produces a corresponding upward movement of the piston bolt 85 in the bore of the sleeve 30$^c$. The fluid which fills these piston chambers is therefore subjected to a temporary supplemental compression which may be greater in amount than that produced by the contraction of the main fluid pressure chamber; and the resistance to this supplemental compression, combined with that to the concurrent closing of the coil spring 86, reinforces the elastic restraint of the semi-pneumatic spring unit on the oscillatory movements of the suspension system.

In order to provide a pneumatic "damping", or retardation, of the recoil movements of the compressed spring elements—when the displaced members return toward normal load position—I may provide the casing cap 15$^{cc}$ with an outwardly opening valve 47$^c$ and an air supply port, 48$^c$, that communicates with a passage 48$^{cc}$ in the head 73. In the normal load position (Fig. 14) the passage way 48$^{cc}$ is uncovered by the collar 80; but when the compression stroke begins the said passage is closed (by the upward movement of the collar 80); and the air surrounding the coils of the spring 34$^c$ and the concentric collars 79 and 80 is, in large part, expelled through the valve 47$^c$, by the continued compression movement. When the parts begin to return toward normal load position the valve 47$^c$ closes and the separation of the casing and plunger members creates a partial vacuum in the top of the casing chamber that serves to elastically "damp" the recoil of the supplemental spring elements and to thereby retard the rapid expansion of the suspension system.

Figs. 18 to 24 inclusive show further embodiments of my invention which differ in some respects from the previously described exemplifications thereof. In the organizations depicted on this fifth sheet of my drawings the supplemental spring is directly interposed between the end of the main spring and the primary lever element of the suspension system, and is actuated and compressed in opposite directions—or from opposite ends—by the compressive and rebound movements of the body and axle members of the chassis structure. In this species of construction the primary and the secondary suspension units, and the primary lever connections therefor, are all in direct series relationship with each other, and the secondary lever elements assume the form of rigid attachments to the main spring.

In the structure illustrated in Figs. 18 and 19, the outer end of the main spring, 1, is provided with a curved extension arm $5^d$ which is rigidly clamped thereto by the eye and saddle bolts $7^d$, and which is pivotally connected to the supplemental spring plunger $18^d$ by means of the pintle bolt $9^d$. The plunger $18^d$ slides longitudinally in the casing sleeve $15^d$ which is carried by the bracket $16^d$ that is secured to the body horn 2 by the bolts $17^d$; and this plunger is itself bored to receive an inner inverted cup plunger $18^{dd}$ which is provided with a central stem $30^d$ that engages at its lower end with the central extension $22^d$ of the outer plunger $18^d$. The ends of the mutually reciprocable parts $18^{dd}$ and $22^d$ are provided with suitable packing rings $19^d$ and $31^d$ (one of which is shown in greater detail in Fig. 20); and the chamber enclosed by the reversely turned cup plungers, $18^{dd}$ and $18^d$—$22^d$, constitutes a fluid pressure container that may be charged with the desired quantity of liquid (e. g., to the level, L) and gas through a suitable valve controlled opening not here shown. A complemental coil spring $34^d$, which is capable of supporting a substantial part of the normal load on the body member 2—and which, therefore, serves to substantially reduce the necessary pressure in the "air spring" cell—is also interposed between the reversely turned ends of the cup members, $18^d$ and $18^{dd}$. The stem $30^d$ is provided with a passage way $54^d$ which leads from the recessed outer end of the inner plunger $18^{dd}$ to the chamber $45^d$ in the extension $22^d$ of the outer plunger; and the lower end of this passage is closed by a downwardly opening flap valve $44^d$. Any liquid that leaks past the packing ring $19^d$ will be returned through the passage $54^d$ to the chamber $45^d$, and any leakage past the ring $31^d$ will also be collected in this same chamber.

The outer plunger $18^d$ is preferably closed at its upper end by a frusto-conical head 90, that is centrally perforated to receive an upper extension $30^{dd}$ of the inner plunger stem, and is provided with a suitable packing gland through which the said extension passes. The top of this extension stem is normally engaged with the closed upper end of the casing sleeve $15^d$, and is notched, at $6^d$, to receive the outer extremity of a lever $3^d$ that passes through a slot $27^d$ in the rear side of the said casing sleeve. The lever $3^d$ is offset, at its central portion, to pass around the body horn 2; is pivotally supported at its inner end on the body bracket $4^d$; and is coupled, at an intermediate point in its length, with the axle block by means of the flexible strap and link connections $10^d$—$12^d$ and the adjustable clamp $14^d$.

The operation of the last described embodiment of my invention is generically the same as that of the previously considered organizations, although the manner in which the supplemental spring is actuated is slightly different. When the normally loaded system shown in Fig. 18 is subjected to a kinetic increase in compressive stress, the resultant movement of the axle-supported main spring elements, 1—$5^d$, toward the body supported elements 2—$15^d$ (as indicated in the dotted lines C—c of that figure) will lift the outer plunger $18^d$ relatively to the inner plunger $18^{dd}$—which is limited in its upward movement by the engagement of its stem $30^{dd}$ with the top of the casing $15^d$—and the cooperating elements of the semi-pneumatic supplemental spring will be compressed by the approach of these reversely turned cup members. The continuation of this compression stroke will force the liquid which has collected in the piston chamber $45^d$ back, through the valve $65^d$ in the lower part of that chamber, into the main fluid pressure reservoir. During this phase of the operation the lever $3^d$, and its "one way" connection $10^d$—$12^d$ with the axle member, is inactive. On the reverse displacement from normal load position (see Fig. 19) the separation of the body and axle parts rocks the lever $3^d$ in a counterclockwise direction (by the pull of the strap and link connections $10^d$—$12^d$) and forces the inner plunger $18^{dd}$ downwardly in the outer plunger $18^d$. The effect of this action is to again compress the supplemental spring elements, and to transmit the increased compression strain to the end of the main spring 1, (through the lever support $5^d$); thus concurrently increasing the positive flexure, and the elastic reaction restraint, of the primary suspension element, to a corresponding degree. It will be apparent that during all phases of the operation there will be a constant balance between the flexural strains in the two series connected suspension units; but that either one of them may become rigid without interfering with the continued free flexure of the other.

The compression of the supplemental spring elements—no matter how produced—moves the upper end of the inner plunger $18^{dd}$ away from the adjacent head 90 of the outer plunger $18^d$. If this head is made imperforate—as here shown—this movement creates a partial vacuum, in the expanding space between the relatively moving parts; and the "suction" thus produced supplements the effect of the secondary spring compression in resisting displacements of the system from static equilibrium, and therefore assists the function of the complemental coil spring $34^d$ in reducing the initial pressure in the air spring element of the combination. But I may, if desired, provide the head 90 with a composite air valve similar to the one illustrated as one feature of the exemplification shown in Figs.

3 and 4, (parts 46 to 51 inclusive) and in such case the action will be modified in the manner there described.

In the construction diagrammatically depicted in Figs. 21 to 24 the supplemental spring unit comprises a twin cylinder casing 15$^e$ which is rigidly attached to the body horn 2 by the bolts 17$^e$, 17$^e$ etc.; and a pair of composite plunger elements, 18$^e$—18$^{ee}$, 18$^e$—18$^{ee}$, which slide longitudinally in the two parallel casing chambers and are pressed apart by the complementary coil springs 34$^e$—34$^e$. The upper pair of short piston plungers, 18$^{ee}$, 18$^{ee}$, are connected—by the rods, 30$^e$, 30$^e$, and the shackle links, 6$^e$—6$^e$—with the outer end of a twin arm lever 3$^e$; and the lower pair of associated members 18$^e$, 18$^e$, are jointly supported on the eye end of the main spring 1 by means of the U shaped cross bar 91, and the rigid extension arm 5$^e$ which is rigidly clamped to the said spring by the bolts 7$^e$ and is in sliding engagement with the lower recessed edge of the said cross bar. The plungers 18$^e$ are provided with long central extensions, 22$^e$, 22$^e$, which closely engage the rods, 30$^e$, 30$^e$; and the upper edges and ends of the said plungers and their extensions may be fitted with suitable packing rings, (e. g., such as are illustrated in Figs. 7 and 8), in order to retain a charge of compressed fluid that can be introduced into the casing-piston chambers (through the valve connection 35$^e$) for the purpose of complementing the elastic restraint action of the twin coil springs, 34$^e$, 34$^e$.

The lever 3$^e$ is, in this case, pivotally mounted on an axle bracket 4$^e$, and is flexibly coupled to the body member of the chassis frame by the adjustable strap connection 10$^e$—14$^e$. The operation of this lever control and its cooperating parts is similar to that of the analogous combination shown in Figs. 18 and 19. When the system is subjected to compressive shocks—which tend to move the members from the normal load position of Fig. 21 toward the dotted line positions C—c—c of Fig. 22—the lever 3$^e$ is inactive; but the supplemental spring elements are compressed by the lifting of the main spring-lever-cup plunger elements, 1—5$^e$—91—18$^e$, toward the body supported parts 2—15$^e$—18$^{ee}$. This secondary spring compression will continue until the ends of the cup plungers, 18$^e$—22$^e$, abut against the lower faces and hubs of the piston plungers 18$^{ee}$; after which a further approach of the axle and body parts will be resisted by the continued independent flexure of the main spring alone. When the system is subjected to rebound or expansion stresses—which tend to move the parts toward the full line positions R—r of Fig. 22—the pull of the tensioned strap 10$^e$ rocks the lever 3$^e$ in a counter-clockwise direction and pulls the piston plungers 18$^{ee}$ downwardly away from the top of the casing cylinders 15$^e$ (as best shown in Fig. 24). This movement subjects the secondary spring elements to increased flexural strains, which are, in turn, directly transmitted to, and balanced against, a correspondingly augmented bending of the primary suspension member 1; and the concurrent, cooperative, and progressively increased elastic resistances of the series connected springs quickly absorb and check the displacements of the chassis members from the position of static equilibrium.

The restraint action of the secondary spring elements on rebound movements is augmented by the reduction in pressure above the piston plungers 18$^{ee}$, as the latter move away from the closed ends of the casing 15$^e$; and the ratio between the displacement movements on compression and expansion, and the accompanying elastic resistances thereto, can be further varied, as before, by altering the distance from the pivotal support, 4$^e$ to the lever connection with the adjustable strap 10$^e$. After the piston members 18$^{ee}$ have been brought into engagement with the cup members 18$^e$—as shown in Fig. 24—the further rebound of the body and axle members will result in an accelerated positive flexure of the main spring alone (by reason of the unitary downward movement of the contacting parts 18$^{ee}$—18$^e$); and, if, on the other hand, the fluxure of the primary suspension member should be arrested before the compression limit of the supplemental spring elements had been reached, the latter elements would continue to yield independently of the temporarily rigid main spring.

The several exemplifications of the invention hereinbefore described are all generically similar to those previously disclosed in my earlier application, Ser. No. 400,256, filed July 30th, 1920; and the present application may be considered as, in part, a continuation thereof. But my present invention also embraces various specific features of construction and operation—e. g., the semi-pneumatic supplemental spring suspension and the pneumatic recoil check therefor—the advantages of which will now be readily understood and appreciated by engineers and others skilled in this art; and with this and the previous disclosure as a guide those familiar with the manufacture and application of vehicle shock absorbing devices will be enabled to utilize my improvements—in whole or in part as may be deemed advantageous—in conjunction with any desired type of main spring suspension systems for chassis frames or other analogous structures on which such devices may be used. I do not therefore desire to herein limit myself to any particular utilization of this invention or to any specific embodiment thereof, save as may be indicated in the appended claims, to wit:—

1. A shock absorber suspension for two relatively movable members which comprises a main spring, a semi-pneumatic supplemental spring cooperating in series therewith, and means conjoining these springs in series relationship with the said members, whereby any displacement of the latter from the position of static equilibrium will concurrently subject all of the elastic elements of the suspension to increased flexural compression or strain.

2. In an elastic suspension system for two relatively movable members the combination of a primary spring suspension unit, a secondary semi-pneumatic suspension unit comprising solid and air spring elements in parallel with each other, and a linkage conjoining the movable members and the suspension units in series relationship and subjecting all elements of the said units to increased flexural compression or strain whenever the said members are displaced from the position of static equilibrium.

3. In a shock absorber organization for vehicles the combination of a main spring attached to one of the chassis frame members, a supplemental semi-pneumatic spring attached to another relatively movable member thereof, and a linkage system conjoining the otherwise unattached ends of the main and supplemental springs in series relationship, and subjecting them to concurrently increased stresses whenever the body and axle parts of the vehicle are displaced from the position of static equilibrium.

4. In a spring suspension system for vehicles the combination of a main leaf spring element, a supplemental semi-pneumatic spring comprising an elastic solid element and a fluid pressure element in parallel therewith, means for supporting the said springs on different relatively movable parts of the vehicle chassis, and other means conjoining the said springs and the supports therefor in operative series relationship whereby all of the elastic elements are subjected to increased flexural stress by any displacement of the said movable parts from normal load position.

5. In a spring suspension system for two relatively movable members the combination of a main spring unit attached to one of said members, a semi-pneumatic spring unit comprising a solid elastic element and an elastic fluid element attached in parallel to the other of said members, a linkage system conjoining said spring units in series relationship and conjointly subjecting the elastic elements thereof to balanced and progressively increased flexural strains as the said members move away from the position of static equilibrium.

6. In a spring suspension system for vehicles the combination of a main spring mounted on one of the chassis frame members, a supplemental spring supported on another of the said members, means conjoining said springs in series relationship whereby both are concurrently subjected to balanced flexural strains in all positions of the system, and means for pneumatically damping the recoil movements of the flexed supplemental spring.

7. A shock absorber organization for relatively movable members which comprises a plurality of springs interposed in series relationship, between the said members, a linkage system conjoining said members and said springs and subjecting the latter to concurrently increased elastic strains in all positions of displacement from static equilibrium, and pneumatic damping means for retarding the recoil or return of the displaced members to normal load position.

8. In an elastic suspension system for vehicle bodies the combination of a main leaf spring, a semi-pneumatic spring having a solid elastic element and an elastic fluid element arranged in parallel relationship with each other, a linkage conjoining said springs in series to two relatively movable parts of the vehicle chassis and subjecting them to cooperatively balanced and concurrently increased flexural strains in all positions of displacement from normal load position, and means for pneumatically damping and retarding the return of the flexed springs to said position.

9. In a resilient suspension system for two relatively movable members the combination of a main spring mounted on one of said members, a secondary spring mounted on the other of said members, a lever flexibly attached to said main spring, a second lever fulcrumed on the first mentioned lever and pivotally connected with the said secondary spring, and a one way coupling conjoining one of said levers with one of the said relatively movable members and acting to impose concurrent and continually increasing flexures on both springs whenever the said members are separated.

10. In a resilient support for two relatively movable members the combination of a main spring mounted on one of the said members, a lever pivotally attached to said main spring, a supplemental spring supported by the other of said members, a second lever flexibly connected to the first mentioned lever and to the said supplemental spring, and means conjoining one of the said levers with one of said relatively movable members and acting to impose interbalanced and progressively increased flexures on both springs whenever said members move away from the normal position of static equilibrium.

11. In a resilient suspension system for vehicles the combination of a spring mounted on the axle member, another spring mounted on the body member, means for coupling said axle and body springs in series relationship and imposing a concurrently increased flexure thereon whenever the system is compressed, and other means for maintaining the said springs in series relationship and again subjecting them to concurrently augmented flexure when the system rebounds or expands beyond the normal load position.

12. A spring suspension system for connecting the body and axle members of a vehicle which comprises the combination of a main spring mounted on one of said members, a secondary spring secured to the other of said members, a lever system conjoining said springs in series relationship and acting to concurrently increase the flexure thereof when the said body and axle members are subjected to compressive shocks, and a one way connection between said lever system and one of the vehicle members and acting to again concurrently increase the flexure of both springs when the said members rebound or expand beyond the position of static equilibrium.

13. A shock absorber system for two relatively movable members which comprises a main spring interposed between the said members, a supplemental spring supported by one of them, means connecting said springs in series relationship and progressively increasing their flexure during compression movements of the said members, other means for maintaining said series relationship and for again increasing the initial flexure of the said series connected springs when the members expand or separate beyond normal position, and means for pneumatically damping the return movements toward said normal position.

14. In a resilient suspension system for vehicles, the combination of one spring mounted on the axle of the vehicle, a second spring carried by the body thereof, a plurality of lever elements conjoining said springs in continual series relationship, means for maintaining the said lever elements in substantially fixed relation with respect to each other when the body and axle parts are displaced in one direction from the normal load position, and other means for moving the said lever elements relatively to each other and concurrently imposing increased flexures on both springs when the said parts are displaced in the opposite direction from the said normal position.

In testimony whereof I have hereunto set my hand.

FRANK L. O. WADSWORTH.